US011629675B2

(12) United States Patent
Boger et al.

(10) Patent No.: US 11,629,675 B2
(45) Date of Patent: Apr. 18, 2023

(54) COOLING SYSTEM AND A COOLING ARRANGEMENT FOR A MOTOR VEHICLE

(71) Applicant: Mahle International GmbH, Stuttgart (DE)

(72) Inventors: Markus Boger, Stuttgart (DE); Sascha Lindauer, Schorndorf (DE)

(73) Assignee: Mahle International GmbH

( * ) Notice: Subject to any disclaimer, the term of this patent is extended or adjusted under 35 U.S.C. 154(b) by 0 days.

(21) Appl. No.: 17/104,735

(22) Filed: Nov. 25, 2020

(65) Prior Publication Data
US 2021/0164423 A1    Jun. 3, 2021

(30) Foreign Application Priority Data
Nov. 27, 2019 (DE) .......................... 102019218390.5

(51) Int. Cl.
*F01P 3/18* (2006.01)
*F28F 27/02* (2006.01)
*B60K 11/04* (2006.01)
(Continued)

(52) U.S. Cl.
CPC ............. *F02M 31/20* (2013.01); *B60K 11/04* (2013.01); *F01P 3/18* (2013.01); *F01P 5/10* (2013.01);
(Continued)

(58) Field of Classification Search
CPC ..... F02M 31/20; F01P 3/18; F01P 5/10; F01P 7/14; F01P 2003/182; F01P 2005/105;
(Continued)

(56) References Cited

U.S. PATENT DOCUMENTS 6,601,545 B1    8/2003  Hohl
7,650,753 B2    1/2010  Muller et al.
(Continued)

FOREIGN PATENT DOCUMENTS

CN      1914412 A       2/2007
CN    101225764 A       7/2008
(Continued)

OTHER PUBLICATIONS

Chinese Search Report dated Mar. 28, 2022 for copending Chinese App. No. 202011337086.9 (with English translation).
Chinese Office Action dated Apr. 2, 2022 for copending Chinese App. No. 202011337086.9 (with English translation).

*Primary Examiner* — Jacob M Amick
(74) *Attorney, Agent, or Firm* — Fishman Stewart PLLC

(57) ABSTRACT

A cooling system for a motor vehicle may include a first circuit, a second circuit, a first heat exchanger incorporated in the first circuit, and a second heat exchanger incorporated in the second circuit. The first heat exchanger and the second heat exchanger may be flowed through by ambient air and a coolant. The first heat exchanger may be arranged, relative to an airflow direction, in front of and directly adjacent to the second heat exchanger. The first circuit and the second circuit may be fluidically connected to one another at an upstream distribution point and at a downstream collection point such that a part mass flow of the coolant is flowable from the second circuit into the first circuit at the distribution point, from the first circuit into the first heat exchanger, and out of the first heat exchanger back into the second circuit at the collection point.

19 Claims, 7 Drawing Sheets

(51) Int. Cl.
*F02M 31/20* (2006.01)
*F28D 1/04* (2006.01)
*F01P 7/14* (2006.01)
*F01P 5/10* (2006.01)

(52) U.S. Cl.
CPC .............. *F01P 7/14* (2013.01); *F28D 1/0435* (2013.01); *F28F 27/02* (2013.01); *F01P 2003/182* (2013.01); *F01P 2005/105* (2013.01); *F01P 2007/146* (2013.01); *F28F 2210/10* (2013.01); *F28F 2250/08* (2013.01); *F28F 2250/102* (2013.01)

(58) Field of Classification Search
CPC .............. F01P 2007/146; F28D 1/0435; F28D 2021/0094; F28F 27/02; F28F 2210/10; F28F 2250/08; F28F 2250/102; B60K 11/04
See application file for complete search history.

(56) References Cited

U.S. PATENT DOCUMENTS

| | | |
|---|---|---|
| 7,874,154 B2 | 1/2011 | Raab et al. |
| 8,769,977 B2 | 7/2014 | Renner et al. |
| 2010/0139626 A1 | 6/2010 | Raab et al. |
| 2018/0236842 A1 | 8/2018 | Allgaeuer et al. |
| 2020/0116070 A1* | 4/2020 | Han ................ F02M 26/28 |

FOREIGN PATENT DOCUMENTS

| | | |
|---|---|---|
| CN | 102596603 A | 7/2012 |
| CN | 107848368 A | 3/2018 |
| DE | 19954327 A1 | 7/2001 |
| DE | 102009059237 A1 | 6/2011 |
| DE | 102017010529 A1 | 5/2018 |
| EP | 1380736 A1 | 1/2004 |

* cited by examiner

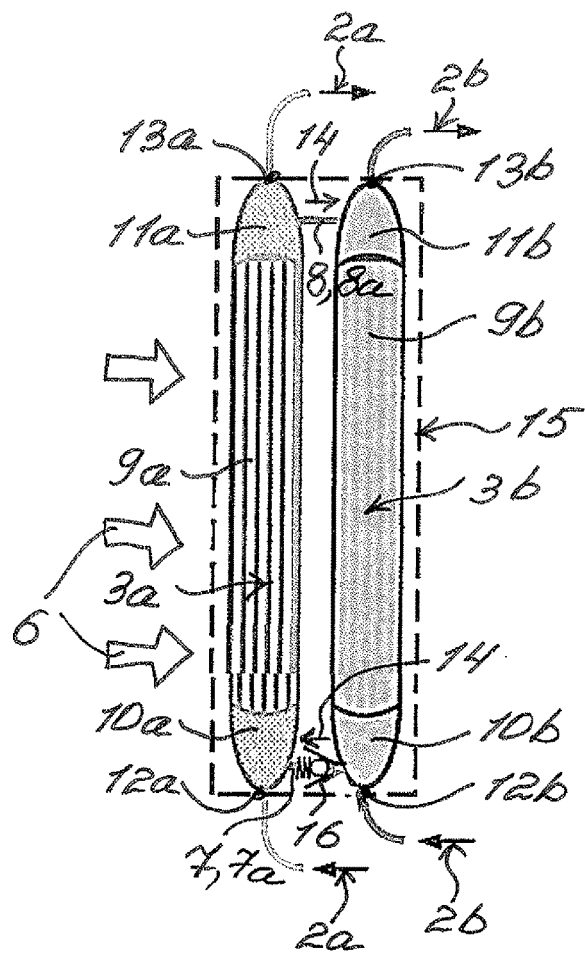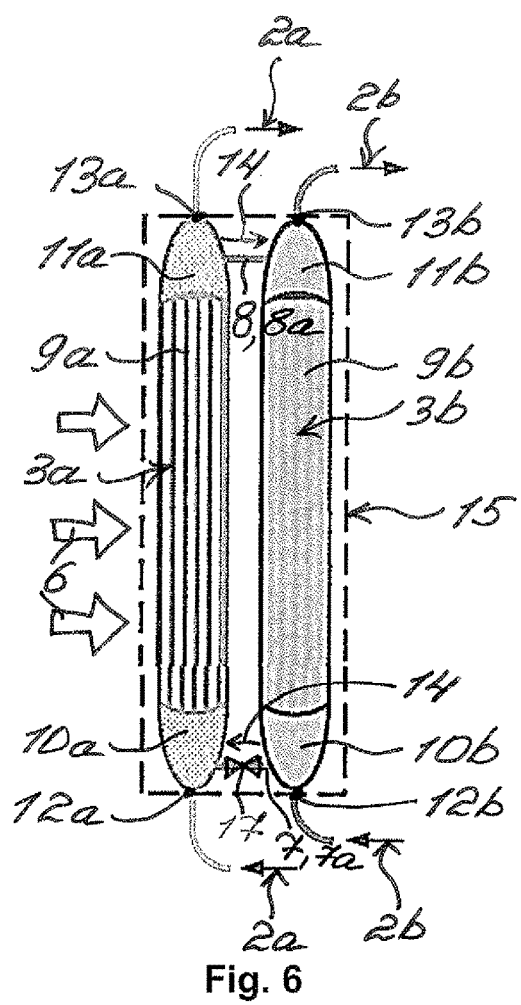
Fig. 5
Fig. 6

COOLING SYSTEM AND A COOLING ARRANGEMENT FOR A MOTOR VEHICLE

CROSS-REFERENCE TO RELATED APPLICATIONS

This application claims priority to German Patent Application No. DE 10 2019 218 390.5, filed on Nov. 27, 2019, the contents of which is hereby incorporated by reference in its entirety.

TECHNICAL FIELD

The invention relates to a cooling system for a motor vehicle. The invention also relates to a cooling arrangement for the cooling system. Furthermore, the invention relates to a method for operating the cooling system.

BACKGROUND

For cooling individual components of a motor vehicle a cooling system is usually employed. Here, the cooling system comprises multiple separate circuits in which the coolant then circulates and cools the individual components of the motor vehicle. Thus, a circuit for cooling the traction battery and a further circuit for cooling or for condensing refrigerant of the air conditioning system can be employed in a battery-electric motor vehicle. In a motor vehicle with internal combustion engine, a circuit for cooling charge air for the internal combustion engine and a further circuit for cooling or condensing refrigerant of the air conditioning system can be alternatively employed. Then, separate heat exchangers are incorporated in the two circuits in which the coolant is then cooled by ambient air or cooling air.

To this end, the heat exchangers are usually arranged on the vehicle front one behind the other so that the heat exchangers are flowed through by ambient air in succession. In the process, the ambient air is steadily heated while flowing through the heat exchangers. The heat exchanger arranged upstream or connected upstream on the air side is supplied with ambient air at a temperature level of the surroundings in the process and the heat exchange arranged downstream or connected downstream on the air side is supplied with the ambient air at a higher temperature level because of the heat output in the heat exchanger connected upstream on the air side.

Through the continuous heating of ambient air the heat to be dissipated from the coolant is emitted at an increasingly higher temperature level. This is significant in particular when the higher temperature level has a negative effect on the efficiency and the capacity of the respective circuit and the heat emission in such a case is possible only expending more energy. When for example the heat exchanger connected downstream on the air side is provided for cooling or for condensing refrigerant of the air conditioning system, the heat emission at the higher temperature level can result in an increased energy requirement of the air conditioning system.

In order to solve this problem, the sequence of the heat exchangers while being flowed through with ambient air can be changed for example. However this means that the circuit with the heat exchanger now connected downstream on the air side can have a higher temperature level and possibly an increased energy requirement. Furthermore, the maximum permissible temperature of the coolant in the circuit that is now connected downstream on the air side can also be exceeded. Alternatively, one or more additional heat exchangers can be incorporated in the respective circuits. However this brings with it additional costs and the additional installation expenditure. Furthermore, the heat exchangers can also be embodied as split heat exchangers, which are then arranged in a row next to one another and are flowed through with ambient air simultaneously or parallel to one another. None of these approaches however offers a sufficiently flexible and efficient solution.

SUMMARY

The object of the invention therefore is to state for a cooling system of the generic type having two heat exchangers connected downstream of one another on the air side an improved or at least alternative embodiment, with which the described disadvantages are overcome. In particular, the temperature level for the heat emission in the circuit with the heat exchanger connected downstream on the air side is to be lowered. The object of the invention also is providing a corresponding cooling arrangement with the heat exchangers for the cooling system. The object of the invention, furthermore, is to provide a suitable method for operating the cooling system.

According to the invention, these problems are solved through the subject matter of the independent claim(s). Advantageous embodiments are the subject matter of the dependent claim(s).

A cooling system is provided for a motor vehicle. Here, the cooling system comprises a first circuit and a first heat exchanger, which is incorporated in the first circuit and can be flowed through by the coolant. The cooling system also comprises a second circuit and a second heat exchanger, which is incorporated in the second circuit and can be flowed through by the coolant. The heat exchangers can be flowed through by ambient air in succession and because of this the coolant in the heat exchangers is coolable. Here, the first heat exchanger is arranged in air flow direction in front of the second heat exchanger and directly adjacently to the same. According to the invention, the first circuit and the second circuit are fluidically connected at a distribution point upstream of the heat exchangers and at a collection point downstream of the heat exchangers. At the distribution point, a part mass flow of the coolant from the second circuit can be conducted into the first circuit and thus into the first heat exchanger and at the collection point, the part mass flow of the coolant from the first heat exchanger can now be conducted back into the second circuit.

The cooling system can be provided for a battery-electric motor vehicle. Here, a cooling device for cooling a traction battery and/or an electric drive of the motor vehicle can be fluidically incorporated in the first circuit. Then, an indirect condenser for cooling or condensing refrigerant of an air conditioning system of the motor vehicle can then be incorporated in the second circuit. The cooling system can be provided for a motor vehicle having an internal combustion engine. Here, an indirect charge air cooler for cooling charge air for the internal combustion engine can be fluidically incorporated in the first circuit. Then, an indirect condenser for cooling or condensing refrigerant of an air conditioning system of the motor vehicle can then be fluidically incorporated in the second circuit. It is to be understood that the first circuit and the second circuit can also comprise further elements that can be flowed through by the coolant.

The coolant is liquid and both the heat exchangers are in each case an air-liquid heat exchanger or an air-liquid cooler. Here, the respective heat exchanger can comprise a tube block of multiple flat tubes that can be flowed through by the coolant and of multiple corrugated fins that can be flowed through by ambient air, which are alternately stacked on top of one another. Within the heat exchanger, the coolant and the ambient air can then exchange heat with one another and the coolant cooled by way of this. Here, the two heat exchangers can be configured differently from one another. In particular, the configuration and the size of the tube blocks can deviate from one another. The first heat exchanger is arranged in the air flow direction in front of the second heat exchanger and directly adjacent to the same. This means in this context that the tube blocks of the two heat exchangers lie against one another or have a negligibly small gap between them. In particular, the tube blocks are arranged against one another so that these can be flowed through by ambient air without obstacles.

The two circuits are fluidically interconnected at the distribution point and at the collection point. Here, the two heat exchangers can be flowed through on the coolant side between the distribution point and the collection point parallel to one another. The distribution point, the two heat exchangers and the collection point can be combined as a cooling arrangement, as is explained in more detail in the following. In an advantageous embodiment, only the two heat exchangers and no further elements of the two circuits that can be flowed through—such as for example fluid pumps—are arranged downstream of the distribution point and upstream of the collection point. In other words, further elements of the two circuits that can be flowed through are arranged upstream of the distribution point and downstream of the collection point. Moreover, the two circuits can be fluidically interconnected exclusively at the distribution point and at the collection point and otherwise be fluidically separated from one another. In particular, the two circuits can be fluidically separate from one another upstream of the distribution point and downstream of the collection point.

At the distribution point, the part mass flow can be branched off the second circuit and admixed to the coolant in the first circuit. By way of this, the entire mass flow through the first heat exchanger is increased by the branched-off part mass flow. After the distribution point, this branched-off part mass flow then flows through the first heat exchanger, so that the heat emission of the second circuit can take place partly in the first heat exchanger. Accordingly, the entire mass flow through the second heat exchanger and the heat emission in the second heat exchanger is reduced. At the collection point, the branched-off part mass flow from the first circuit is conducted back into the second circuit. Because of this, the entire mass flows in the two circuits are retained as a whole. Since the first heat exchanger is connected upstream of the second heat exchanger in the air flow direction, the heat emission of the branched-off part mass flow takes place at the temperature level of the surroundings. Because of this, the coolant in the second circuit can be efficiently and energy-savingly cooled.

Advantageously it can be provided that a first fluid pump is fluidically incorporated in the first circuit and a second fluid pump in the second circuit. Practically, the respective fluid pump is arranged upstream of the distribution point and downstream of the collection point. For branching-off the part mass flow at the distribution point, the capacity of the first fluid pump and the capacity of the second fluid pump can be adjusted so that the pressure of the coolant in the second circuit is greater than the pressure of the coolant in the first circuit. When the pressure in the second circuit is above the pressure in the first circuit, an overpressure is created in the second circuit and the part mass flow merges at the distribution point from the second circuit into the first circuit. Here, the pressures depend on the capacity of the fluid pumps and on the pressure drops in the respective circuits—for example in the heat exchangers, pipes and further elements that can be flowed through.

Here, the rate of the part mass flow can be adjusted by way of the pressures in the first circuit and in the second circuit. At the same time, a passing-over of coolant from the first circuit into the second circuit at the distribution point and because of this an undesirable reduction of the cooling capacity of the two circuits can also be prevented. Here, the pressure in the second circuit will always be adjusted higher than or equal to that in the first circuit. In order to make this possible, for example a monitoring and matching of the mass flows or of the pressures in the two circuits can always take place. Alternatively to this, a characteristic diagram-based control can take place during the operation of the cooling system. Accordingly, a measuring of the hydraulic values and in particular of the pressure with different pump capacities in the two circuits can take place in advance and a characteristic diagram subsequently stored. This characteristic map can then be utilised for adjusting the pump capacities during the operation of the cooling system and the appropriate pressure adjusted in the respective circuit. With the characteristic diagram-based control, a continuous monitoring and matching of the mass flows or of the pressures in the two circuits is advantageously not required.

Alternatively, the rate of the part mass flow can be adjusted via the pressures in the first circuit and in the second circuit and a passing-over of coolant from the first circuit into the second circuit at the distribution point prevented by means of a non-return valve. To this end, the non-return valve can be arranged at the distribution point. In this case, the pressure of the coolant in the first circuit can also be adjusted lower than in the second circuit.

Alternatively, a control valve can be arranged at the distribution point or at the collection point. By means of the control valve, the rate of the part mass flow can then be adjusted and a passing-over of coolant from the second circuit into the first circuit at the collection point and/or from the first circuit into the second circuit at the distribution point prevented.

The rate of the part mass flow can be specifically adjusted in the cooling system and by way of this the heat quantity emitted at the respective heat exchangers controlled. On the whole, the heat quantity from the two circuits emitted to ambient air is always almost identical. However the major advantage is that the temperature level of the second circuit is specifically lowered. In particular for operating points of the first circuit away from the extreme conditions or the maximum cooling capacity, the part mass flow of the coolant from the second circuit can be efficiently and energy-savingly cooled in the first circuit.

The invention also relates to a cooling arrangement for the cooling system described above. Here, the cooling arrangement comprises a first heat exchanger and a second heat exchanger. The first heat exchanger can be flowed through by the coolant from an inlet to an outlet and can be fluidically incorporated in a first circuit. The second heat exchanger can be flowed through by the coolant from an inlet to an outlet and can be fluidically incorporated in a second circuit. The heat exchanges can be flowed through by ambient air in succession and because of this the coolant in the heat exchangers is coolable. The first heat exchanger is arranged in air flow direction in front of the second heat exchanger and directly adjacent to the same. Here, the cooling arrangement is a single unit, wherein a distribution point upstream and a collection point downstream of the two heat exchangers connect the same fluidically. By way of this, a part mass flow of the coolant at the distribution point can be conducted from the second circuit into the first circuit and thus into the first heat exchanger and at the collection point conducted back from the first heat exchanger into the second circuit.

The cooling arrangement can be integrated in the cooling system described above and employed for cooling coolant in the two circuits. The advantages resulting from this have already been thoroughly explained above. Here, the cooling arrangement is the individual unit which makes possible a simplified integration of the cooling arrangement in the cooling system. Furthermore, the cooling arrangement is a compact design and the installation space requirement and installation costs can be reduced. The term "individual unit" in this context means that the component parts of the cooling arrangement are detachably or non-detachably fixed to one another and the cooling arrangement can fulfil its function only in this form. In particular, the distribution point and the collection point are arranged within the cooling arrangement, so that the desired interconnection of the two circuits is also already integrated in the cooling arrangement. Thus, the cooling arrangement can be preassembled and integratable in the cooling system as an individual component.

Advantageously, the distribution point can be formed between the inlets and tube blocks of the two heat exchangers and the collection point between the tube blocks and the outlets of the two heat exchangers. The term "upstream" and "downstream" must then be understood in reference to the tube blocks of the heat exchangers. Advantageously, a non-return valve can be arranged at the distribution point, which can prevent passing-over of coolant from the first heat exchanger into the second heat exchanger. Alternatively, a control valve can be arranged at the distribution point or at the collection point which can adjust the rate of the part mass flow at the distribution point and prevent a passing-over of coolant from the second circuit into the first circuit at the collection point and/or from the first heat exchanger into the second heat exchanger at the distribution point. In order to avoid repetitions, reference regarding to the function of the non-return valve and of the control valve is made at this point to the above explanations.

In an advantageous embodiment of the cooling arrangement it is provided that the distribution point is formed by a distribution tube and the collection point by a collection tube. Here, the distribution tube fluidically connects a distribution box of the first heat exchanger and a distribution box of the second heat exchanger. The collection tube fluidically connects a collection box of the first heat exchanger and a collection box of the second heat exchanger. The respective distribution boxes are then fluidically interconnected via the distribution tube, so that the coolant from the distribution box of the second heat exchanger can flow into the distribution box of the first heat exchanger and can be conducted further via the flat tubes of the first heat exchanger. Accordingly, the two collection boxes are fluidically interconnected by the collection tube, so that the coolant from the collection tube of the first heat exchanger can flow into the collection box of the second heat exchanger and thus be conducted to the second circuit.

In an alternative advantageous embodiment of the cooling arrangement it is provided that distribution boxes of the two heat exchangers are combined into a common distribution and collection boxes of the two heat exchangers into a common collection box. The distribution boxes of the two heat exchangers are then realised in the common distribution box by two distribution regions that are fluidically separate from one another, which are exclusively fluidically interconnected via the distribution point in the form of a distribution opening. The collection boxes of the two heat exchangers are formed in the common collection box by two collection regions that are fluidically separate from one another, which are exclusively fluidically interconnected via the collection point in the form of a collection opening. In other words, the flat tubes of the first heat exchanger fluidically feed into the first distribution region and in the first collection region and the flat tubes of the second heat exchanger fluidically lead into the second distribution region and enter the second collection region. The inlets of the heat exchangers then lead fluidically into the corresponding distribution region and the outlets of the heat exchangers then lead fluidically into the corresponding collection region. Here, the common distribution box comprises a housing which located inside is separated into the respective distribution regions for example by a separating wall. Accordingly, the collection box then also comprises a housing which located inside is separated into the respective collection regions for example by a separating wall. The distribution opening and the collection opening are then formed in the relevant separating wall. By way of this advantageous configuration, the cooling arrangement can be embodied in a particularly compact manner.

Here, the heat exchangers of the cooling arrangement can be flowed through by the coolant according to an I-flow pattern or according to a U-flow pattern. Regardless of this, the construction of the distribution point and of the collection point as well as the function of the cooling arrangement do not change.

Accordingly, the two heat exchangers can each comprise a distribution box, a collection box and a tube block. Here, the tube block is formed of multiple flat tubes through which coolant can flow and of multiple corrugated fins through which ambient air can flow, which are alternately stacked on top of one another. Within the heat exchanger, the coolant and the ambient air can then exchange heat with one another and the coolant thereby cooled. Here, the respective distribution box and the respective collection box are then arranged at a longitudinal end of the respective tube block and at another longitudinal end of the tube block respectively. The flat tubes of the respective tube block fluidically lead on one side into the respective distribution box and on the other side into the respective collection box. The coolant then flows through the respective heat exchanger from the respective distribution box to the respective collection box according to the I-flow pattern. In other words, the coolant is not deflected in the respective heat exchanger and flows in the same direction in all flat tubes of the respective tube block. The respective inlet then formed in the respective distribution box and the respective outlet of the respective heat exchanger is then formed in the respective collection box. The two heat exchangers are then arranged in the cooling arrangement so that the respective distribution boxes are adjacent to one another and the respective collection boxes are adjacent to one another.

Alternatively, the two heat exchangers can each comprise a distribution box, a collection box, a deflection box and a tube block. Here, the respective tube block is formed of multiple flat tubes through which coolant can flow and of multiple corrugated fins through which ambient air can flow, which are alternately stacked on top of one another. Here, the respective distribution box and the respective collection box are arranged at a longitudinal end of the respective tube block and the respective deflection box at another longitudinal end of the tube block. Several flat tubes of the respective tube blocks fluidically lead on the one side into the respective distribution box and on the other side into the respective deflection box. Remaining flat tubes of the respective tube block the lead fluidically on one side into the deflection box and on the other side into the collection box. Then, the coolant flows from the distribution box through the several flat tubes of the tube block to the deflection box, is deflected in the same and flows through the remaining flat tubes of the tube block to the collection box. By way of this, the coolant flows in the respective heat exchanger according to the U-flow pattern. In other words, the coolant is deflected in the respective heat exchanger and the coolant flows in the several flat tubes of the tube block from the respective distribution box to the deflection box in one direction and in the remaining flat tubes of the tube block from the deflection box to the collection box in an opposite direction. The respective inlet is then formed in the respective distribution box and the respective outlet of the respective heat exchanger is then formed in the respective collection box. The two heat exchangers are then arranged in the cooling arrangement so that the respective distribution boxes are adjacent to one another and the respective collection boxes are adjacent to one another. It is also conceivable that the distribution box of the one heat exchanger and the collection box of the other heat exchanger and correspondingly the collection box of the one heat exchanger and the distribution box of the other heat exchanger are adjacent to one another.

The invention also relates to a method for operating the cooling system described above. Here, a part mass flow is branched off from coolant of the second circuit at the distribution point and added to the coolant of the first circuit. The branched-off part mass flow is then conducted via the first heat exchanger and cooled in the same. At the collection point, the branched-off part mass flow is then branched off from the first circuit and returned into the second circuit. Since the first heat exchanger is connected upstream of the second heat exchanger in the air flow direction, the cooling of the branched-off part mass flow takes place at the temperature level of the surroundings. In other words, the waste heat of the second circuit can be partially emitted at a lower temperature level.

Advantageously, the rate of the branched-off part mass flow can be adjusted dependent on the demanded cooling capacity of the first circuit and on the demanded cooling capacity of the second circuit. Thus, the part mass flow can be greater than zero when the first circuit is not operated under extreme conditions or not at the maximum cooling capacity. When however the first circuit is operated under extreme conditions or at the maximum cooling capacity, the rate of the part mass flow can remain equal to zero and the coolant of the second circuit be completely conducted via the second heat exchanger. By way of this, a possible negative effect of the part mass flow added in the first heat exchanger on the maximum cooling capacity or on the maximum permissible temperature of the coolant of the first circuit is avoided.

Advantageously, a first fluid pump and a second fluid pump can be fluidically incorporated in the first circuit and in the second circuit respectively. The respective fluid pump is practically arranged upstream of the distribution point and downstream of the collection point. For branching-off the part mass flow at the distribution point, the capacity of the pump of the first fluid pump and the capacity of the second fluid pump can be adjusted so that the pressure of the coolant in the second circuit is greater than the pressure of the coolant in the first circuit. The rate of the part mass flow can be adjusted for example via the pressures in the first circuit and in the second circuit. At the same time, a passing-over of coolant from the first circuit into the second circuit at the distribution point can also be prevented. Alternatively, the rate of the part mass flow can be adjusted via the pressures in the first circuit and in the second circuit and a passing-over of coolant from the first circuit into the second circuit prevented at the distribution point by means of a non-return valve. The non-return valve is then arranged at the distribution point. Alternatively, the rate of the part mass flow can be adjusted at the collection point by means of a control valve and a passing-over of coolant from the first circuit into the second circuit at the distribution point prevented. Alternatively, the rate of the part mass flow can be adjusted by means of a control valve arranged at the distribution point and by means of this control valve a passing-over of coolant from the second circuit into the first circuit at the collection point prevented. In order to avoid repetitions, reference to the above explanations in this regard is made at this point.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

FIG. 5 shows a cooling arrangement according to the invention for the cooling system of FIG. 2;

FIG. 6 shows a cooling arrangement according to the invention for the cooling system of FIG. 3;

DETAILED DESCRIPTION

Figure 1:
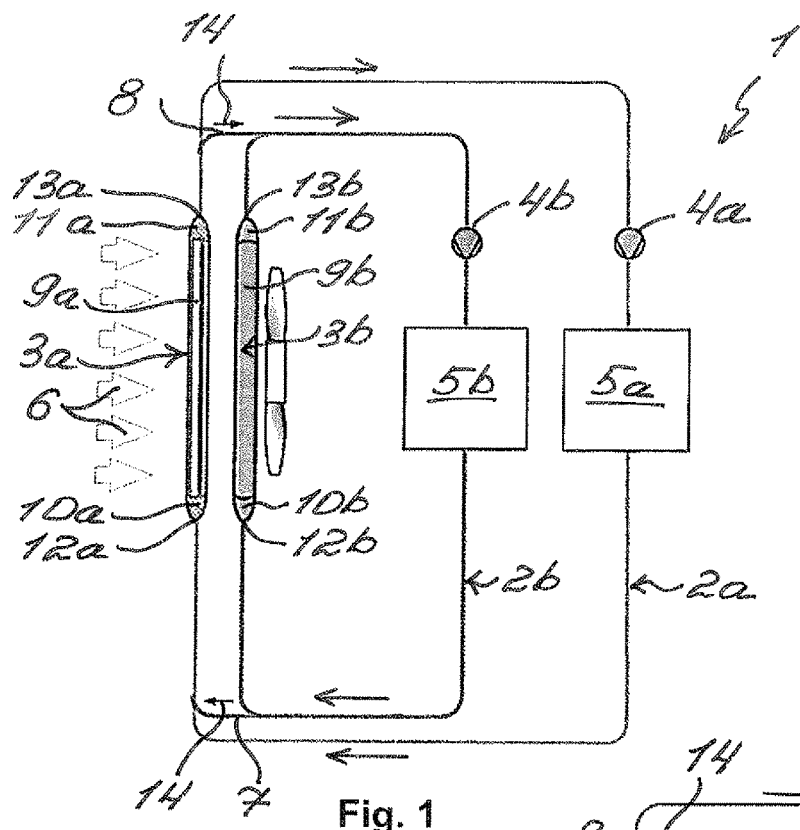
FIGS. 1 to 3 show a cooling system according to the invention in deviating embodiments.

FIG. 1 shows a view of a cooling system 1 according to the invention for a motor vehicle in a first embodiment. Here, the cooling system 1 comprises a first circuit 2a and a first heat exchanger 3a, which is incorporated in a first circuit 2a and can be flowed through by the coolant. In the first circuit 2a, a fluid pump 4a and further elements that can be flowed through by the coolant—here generally marked with 5a—are fluidically incorporated. Furthermore, the cooling system 1 comprises a second circuit 2b and a second heat exchanger 3b, which is incorporated in the second circuit 2b and can be flowed through by the coolant. In the second circuit 2b, a fluid pump 4b and further elements through which coolant can flow—here generally marked with 5b—are additionally incorporated fluidically. When the cooling system 1 is provided for example for a battery-electric motor vehicle, one of the further elements 5a can be a cooling device for cooling a traction battery and/or an electric drive and one of the further elements 5b can be an indirect condenser for cooling or condensing refrigerant of an air conditioning system. When the cooling system 1 is provided for example for a motor vehicle having an internal combustion engine, one of the further elements 5a can be an indirect charge air cooler for cooling charge air for the internal combustion engine and one of the further elements 5b an indirect condenser for cooling or condensing refrigerant of an air conditioning system.

The heat exchangers 3a and 3b can be flowed through by ambient air 6 in succession and by way of this the coolant in the heat exchangers 3a and 3b is coolable. Here, the first heat exchanger 3a is arranged in the air flow direction—here indicated by arrows—in front of the second heat exchanger 3b and directly adjacent to the same. Here, the heat exchanger 3a and 3b respectively comprises a tube block 9a and 9b respectively, which comprises multiple flat tubes and multiple corrugated fins alternating with these. The flat tubes of the tube block 9a and 9b can be flowed through by the coolant and the corrugated fins by the ambient air 6, so that the coolant in the flat tubes is coolable. The flat tubes of the tube block 9a and 9b respectively fluidically lead on the one side into a distribution box 10a and 10b respectively and on the other side into a collection box 11a and 11b respectively. Then, the coolant flows in the heat exchanger 3a and 3b respectively from an inlet 12a and 12b respectively on the distribution box 10a and 10b into the distribution box 10a and 10b respectively, out of the same into the flat tubes of the tube blocks 9a and 9b respectively, out of these into the collection box 11a and 11b respectively and via an outlet 13a and 13b respectively on the collection box 11a and 11b to further elements 5a and 5b respectively. Thus, the heat exchanger 3a and 3b is flowed through according to an I-flow pattern. The flow direction of the coolant is indicated here and further by arrows.

There, the two circuits 2a and 2b are fluidically connected at a distribution point 7 upstream of the heat exchangers 3a and 3b and at a collection point 8 upstream of the heat exchangers 3a and 3b. Because of this, a part mass flow 14 of the coolant from the second circuit 2b can be conducted at the distribution point 7 into the first circuit 2a and thus into the first heat exchanger 3a and cooled there. At the collection point 8, the part mass flow 14 of the coolant from the first heat exchanger 3a can then be conducted back into the second circuit 2b. Because of this, the entire mass flows of the coolant in the circuits 2a and 2b are maintained. Since the first heat exchanger 3a is connected upstream of the second heat exchanger 3b in the air flow direction, the cooling of the branched-off part mass flow 14 takes place at the temperature level of the surroundings. There, the distribution point 7, the two heat exchangers 3a and 3b and the collection point 8 can be combined into a cooling arrangement 15 according to the invention—as shown in FIGS. 4-6 and is explained in more detail in the following.

The rate of the part mass flow 14 can be adjusted dependent on the demanded cooling capacities of the circuits 2a and 2b. When the first circuit 2a is not operated under extreme conditions or not at the maximum cooling capacity, the rate of the part mass flow 14 can be greater than zero and adapted dependent on the demanded cooling capacity in the second circuit 2b. When however the first circuit 2a is operated under extreme conditions or at the maximum cooling capacity, the rate of the part mass flow 14 can remain equal to zero and the coolant of the second circuit 2b conducted completely via the second heat exchanger 3b.

The rate of the branched-off part mass flow 14 can be regulated by way of the pressures in the two circuits 2a and 2b. The pressures depend among other things on the mass flows adjusted with the fluid pumps 4a and 4b and on the pressure drops, for example in heat exchangers, pipes and further elements that can be flowed through—in the two circuits 2a and 2b. When the pressure in the second circuit 2b is above the pressure in the first circuit 2a, an overpressure is generated in the second circuit 2b and the part mass flow 14 merges at the distribution point 7 from the second circuit 2b into the first circuit 2a. Here, the rate of the part mass flow 14 depends on the generated overpressure in the second circuit 2b. In order to avoid coolant from the first circuit 2a passing over into the second circuit 2b, the pressure in the second circuit 2b can be adjusted always the same or via the pressure in the first circuit 2a. This can take place by way of a constant monitoring and matching of the mass flows or of the pressures in the two circuits 2a and 2b. Alternatively to the monitoring, a characteristic diagram-based control can take place during the operation of the cooling system 1.

Figure 4:
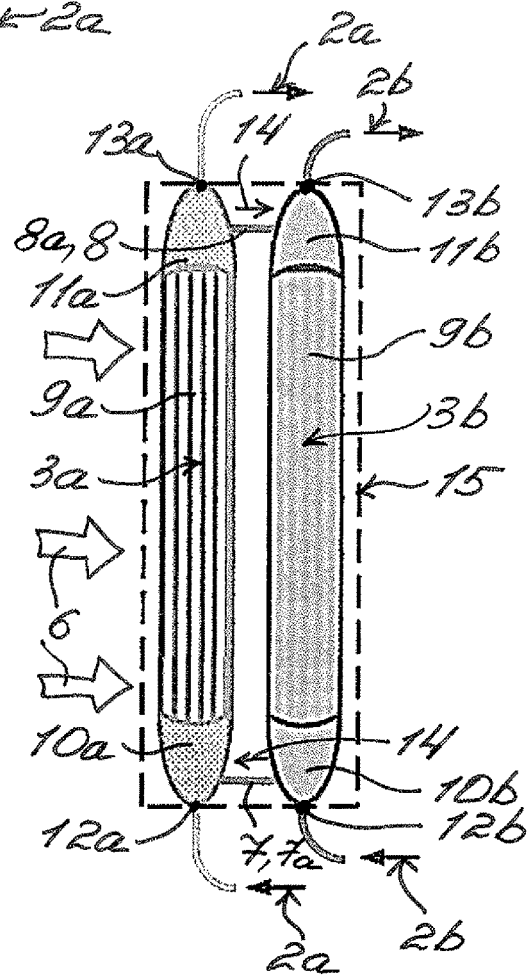
FIG. 4 shows a cooling arrangement according to the invention for the cooling system of FIG. 1.

FIG. 4 now shows a view of the cooling arrangement 15 according to the invention, which is provided for the cooling system 1 in the first embodiment according to FIG. 1. Here, the distribution point 7 is depicted by a distribution pipe 7a and the collection point 8 by a collection pipe 8a. Here, the distribution pipe 7a fluidically connects the distribution box 10a and 10b with one another and is arranged between inlets 12a and 12b and the tube blocks 9a and 9b. The collection pipe 8a fluidically interconnects the collection boxes 11a and 11b and is arranged in each case between outlets 13a and 13b and the tube blocks 9a and 9b. Because of this, the distribution point 7 is arranged upstream of the tube blocks 9a and 9b and the collection point downstream of the tube blocks 9a and 9b. The cooling arrangement 15 is an individual unit which is integratable in the cooling system 1 in the first embodiment in a compact and simplified manner.

Figure 2:
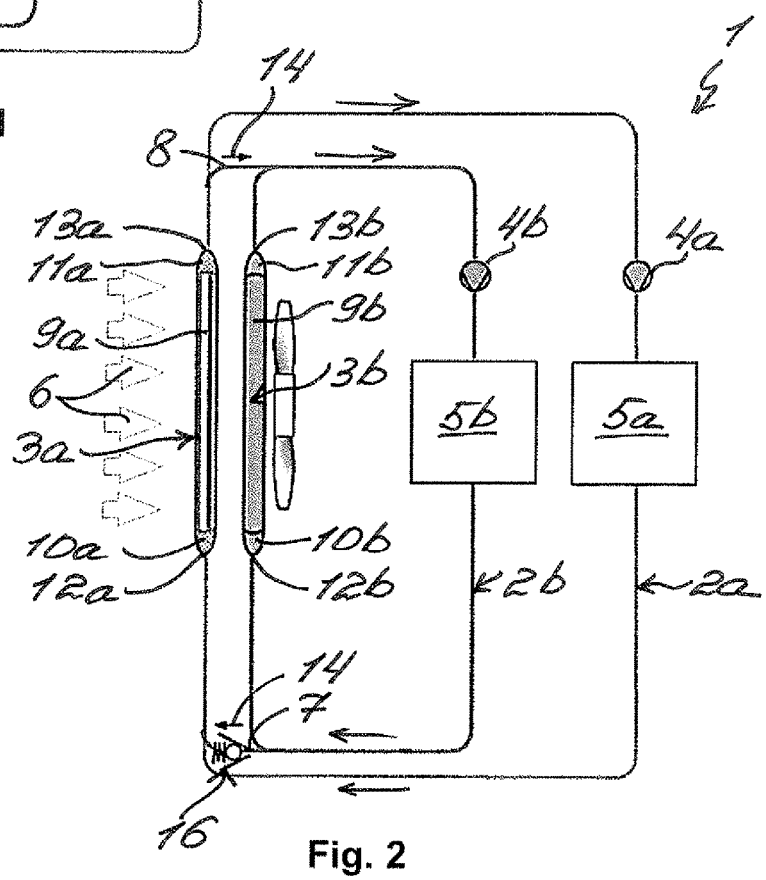

FIG. 2 shows a view of the cooling system 1 according to the invention in a second embodiment. Deviating from the cooling system 1 in the first embodiment, a non-return valve 16 is arranged here at the distribution point 7. The non-return valve 16 prevents coolant from the first circuit 2a passing over into the second circuit 2b at the distribution point 7 and from the second circuit 2b into the first circuit 2a at the collection point 8 independently of the adjusted mass flows or the adjusted pressures in the circuits 2a and 2b. Because of this, regulating the cooling system 1 can be significantly simplified. As for the rest, the cooling systems 1 correspond in the first and second embodiment.

FIG. 5 shows a view of the cooling arrangement 15 according to the invention which is provided for the cooling system 1 in the second embodiment according to FIG. 2. In contrast with the cooling arrangement 15 according to FIG. 4, the non-return valve 16 is arranged here at the distribution point 7 or installed in the distribution pipe 7a. Because of this, the non-return valve is integrated in the cooling arrangement 15. As explained regarding to FIG. 2, the non-return valve 16 prevents coolant from the first circuit 2a passing over into the second circuit 2b independently of the adjusted mass flows or the adjusted pressures in the two circuits 2a and 2b. As for the rest, the cooling arrangements correspond in FIG. 4 and FIG. 5.

Figure 3:
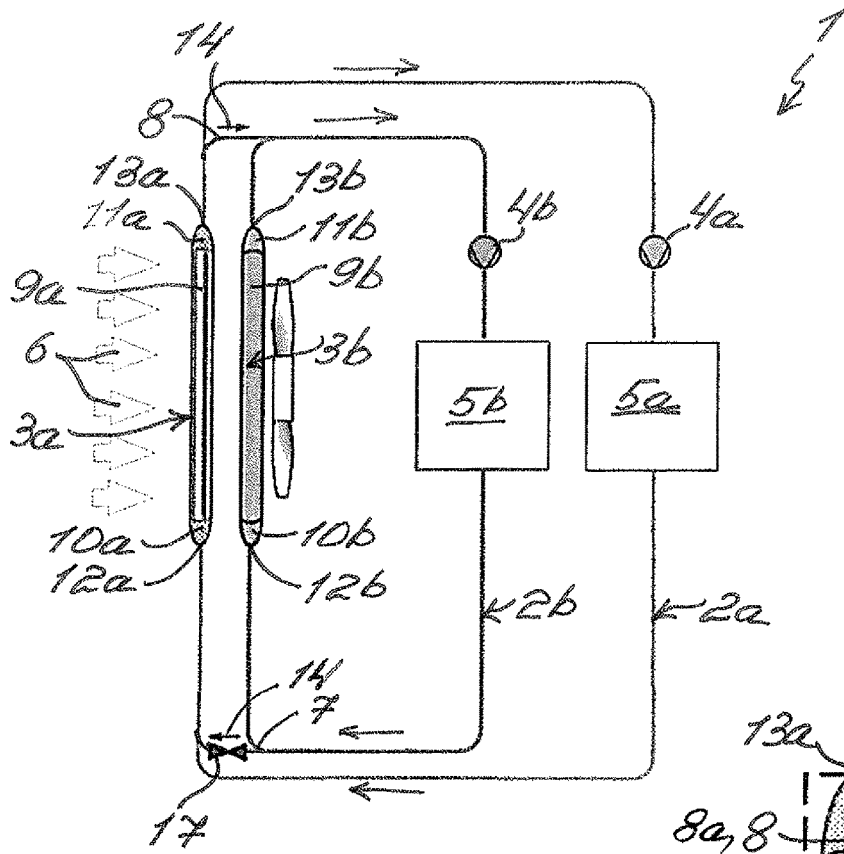

FIG. 3 shows a view of the cooling system 1 according to the invention in a third embodiment. Deviating from the cooling system 1 in the first and second embodiment, a control valve 17 is arranged here at the distribution point 7. The control valve 17 prevents coolant passing over from the first circuit 2a into the second circuit 2b at the distribution point 7 and from the second circuit 2b into the first circuit 2a at the collection point 8 independently of the adjusted mass flows or the adjusted pressures in the circuits 2a and 2b. Furthermore, the control valve 17 regulates the rate of the branched-off part mass flow 14 which passes from the second circuit 2b into the first circuit 2a. Because of this, the regulating of the cooling system 1 can be significantly simplified. As for the rest, the cooling systems 1 correspond in the first, second and third embodiment.

FIG. 6 shows a view of the cooling arrangement 15 according to the invention, which is provided for the cooling system 1 in the third embodiment according to FIG. 3. Deviating from the cooling arrangement 15 in the first and second embodiment, the control valve 17 is arranged here at the distribution point 7 or installed in the distribution pipe 7a. Because of this, the control valve 17 is integrated in the cooling arrangement 15. As explained regarding FIG. 3, the control valve 16 controls the rate of the part mass flow 14 and prevents coolant from the first circuit 2a passing over into the second circuit 2b at the distribution point 7 and from the second circuit 2b into the first circuit 2a at the collection point 8. As for the rest, the cooling arrangements in FIG. 4, FIG. 5 and FIG. 6 correspond.

Figure 7:
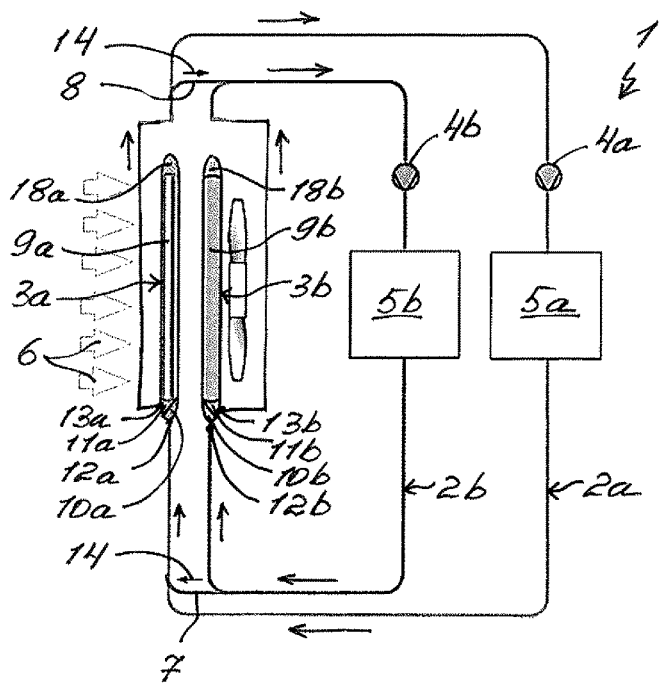
FIG. 7 shows the cooling system according to the invention in a further embodiment.

FIG. 7 now shows a view of the cooling system 1 in a fourth embodiment. Here, the cooling system 1 comprises two heat exchangers 3a and 3b which are flowed through by the coolant according to a U-flow pattern. Otherwise the cooling system 1 in the fourth embodiment corresponds to the cooling system 1 in the first embodiment according to FIG. 1.

Figure 8:
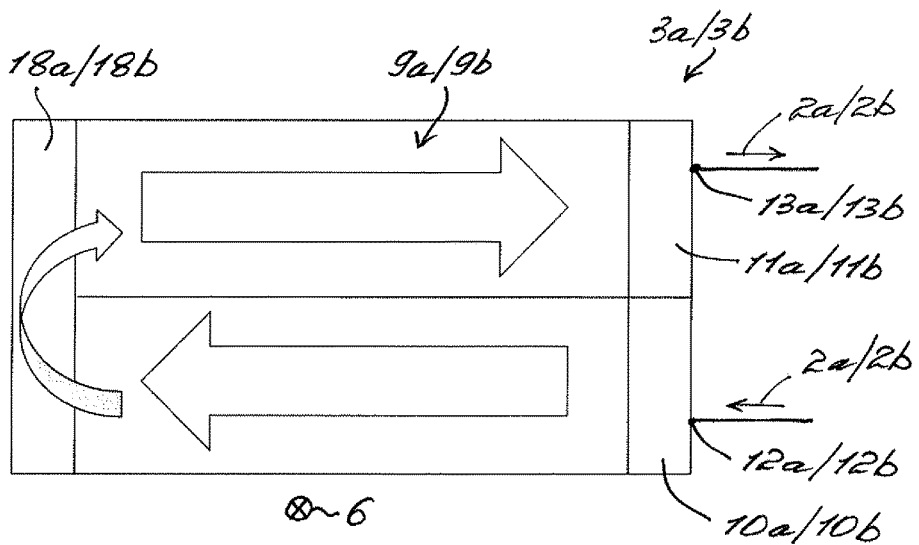
FIGS. 8 to 10 show different views of the heat exchangers of the cooling system shown in FIG. 7.
Figure 9:
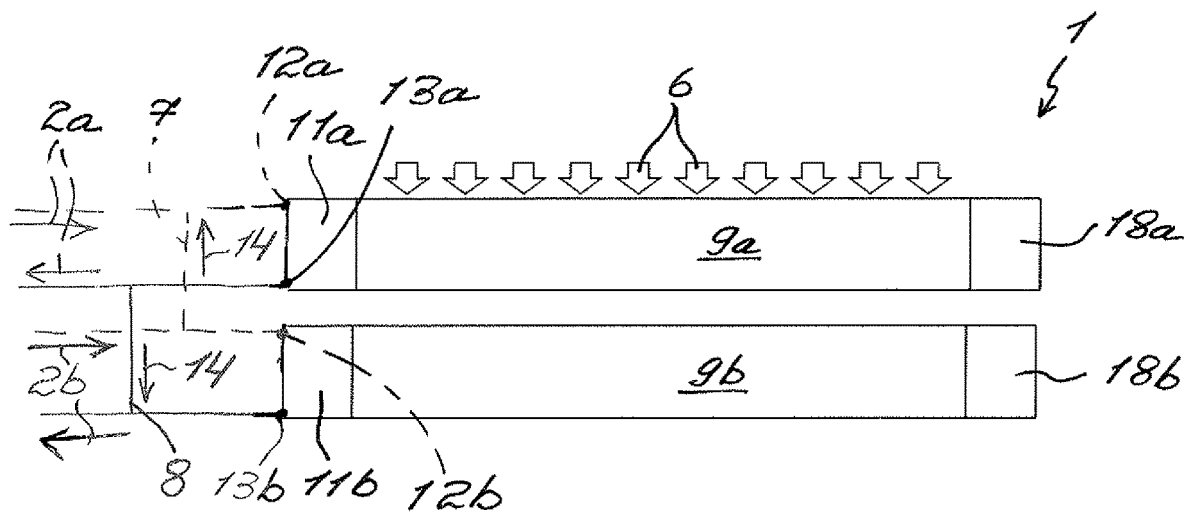
Figure 10:
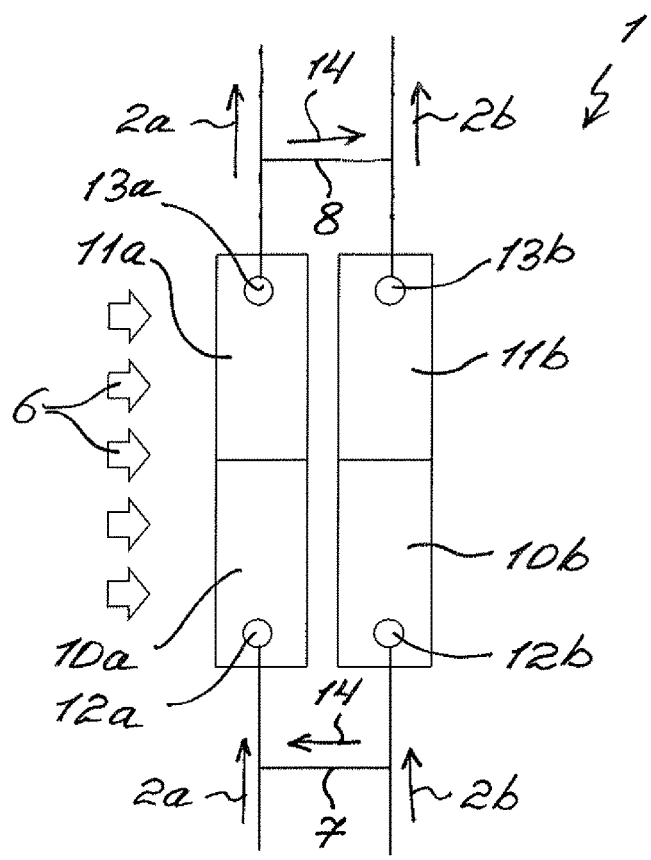

FIG. 8 shows a view of the heat exchanger 3a and 3b in the cooling system according to FIG. 7. FIG. 9 and FIG. 10 show further views of the heat exchangers 3a and 3b in the cooling system 1 according to FIG. 7. In FIG. 9, the distribution boxes 10a and 10b are situated below the respective collection boxes 11a and 11b and are therefore not visible. For this reason, the elements assigned to the distribution boxes 10a and 10b are shown in dashed lines. With reference to FIG. 8, FIG. 9 and FIG. 10, the heat exchanger 3a and 3b besides the distribution box 10a and 10b and the collection box 11a and 11b also comprises a deflection box 18a and 18b. The distribution box 10a and 10b and the collection box 11a and 11b are arranged at a longitudinal end of the tube block 9a and 9b and the deflection box 18a and 18b at an opposite longitudinal end of the tube block 9a and 9b. As indicated with arrows, the coolant flows from the inlet 12a and 12b into the distribution box 10a and 10b and further into several flat tubes of the tube block 9a and 9b. The coolant flows out of these several flat tubes into the deflection box 18a and 18b, is deflected in the same and flows into remaining flat tubes of the tube block 9a and 9b. The coolant flows out of these remaining flat tubes of the tube block 9a and 9b into the collection box 11a and 11b and subsequently out of the outlet 13a and 13b. Because of this, the inlet 12a and 12b and the outlet 13a and 13b are arranged adjacent to one another in the heat exchanger 3a and 3b and assigned to a longitudinal end of the tube block 9a and 9b. This results in the U-flow pattern in the heat exchanger 3a and 3b.

Figures 11, 12:
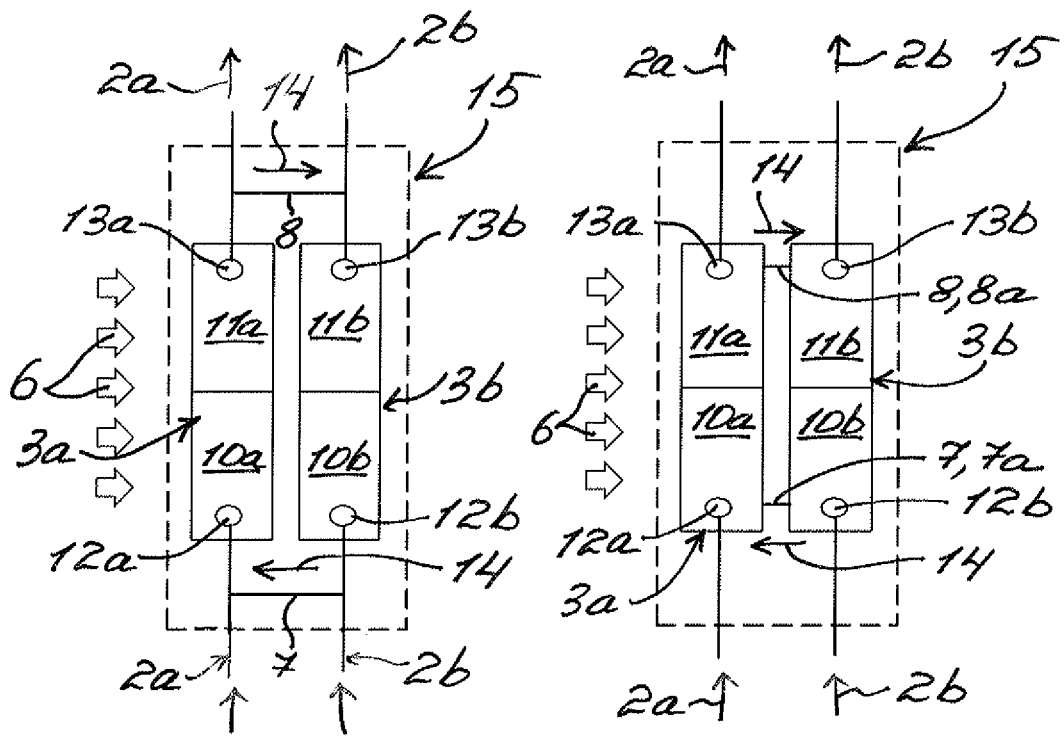
FIGS. 11 to 16 show deviating configurations of the cooling arrangement according to the invention.

FIG. 11 shows a view of the cooling arrangement 15 that is provided for the cooling system 1 in the fourth embodiment according to FIG. 7. Here, the distribution point 7 and the collection point 8 are formed by a pipe each.

FIG. 12 shows a view of the cooling arrangement 15 that is provided for the cooling system 1 in the fourth embodiment according to FIG. 7. Here, the distribution point 7 is depicted by the distribution pipe 7a and the collection point 8 by the collection pipe 8a. Here, the cooling arrangement, except of the heat exchangers 3a and 3b flowed through according to the U-flow pattern, corresponds to the cooling arrangement according to FIG. 4.

Figures 13, 14:
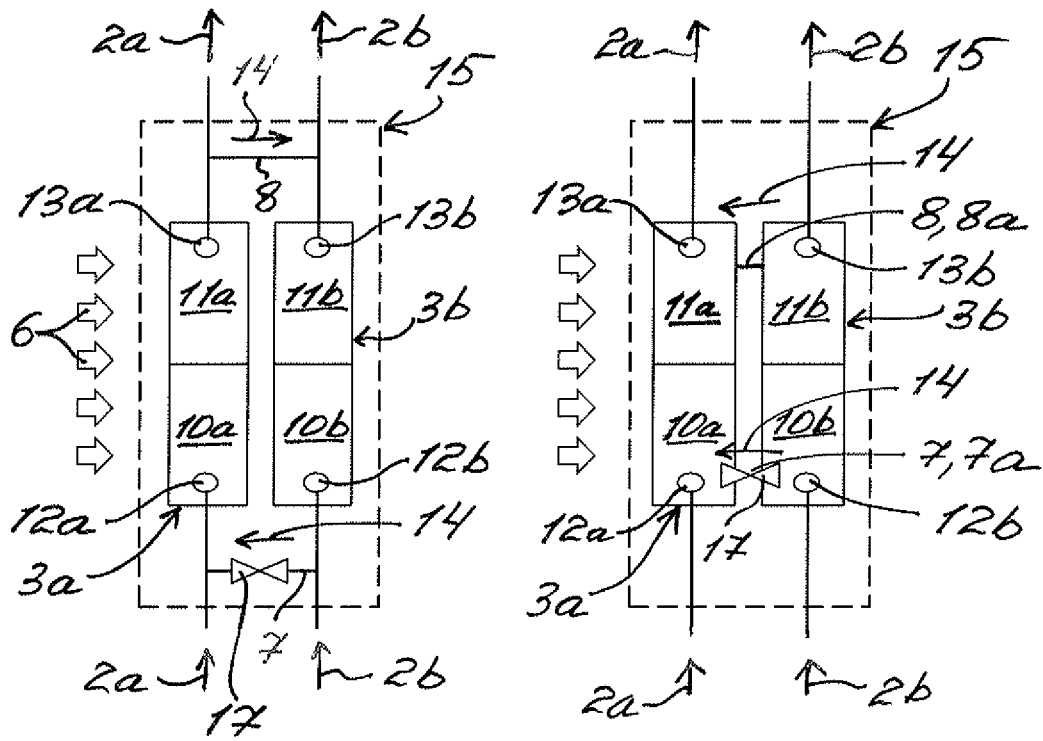

FIG. 13 shows a view of the cooling arrangement 15 which is provided for the cooling system 1. Here, the distribution point 7 and the collection point 8 are each depicted by a pipe. The control valve 17 is arranged at the distribution point 7. Here, the cooling arrangement 15, except for the distribution point 7 configured differently and the collection point 8 configured differently and the heat exchangers 3a and 3b flowed through according to the U-flow pattern, corresponds to the cooling arrangement according to FIG. 6.

FIG. 14 shows a view of the cooling arrangement 15 which is provided for the cooling system 1. Here, the distribution point 7 is depicted by the distribution pipe 7a and the collection point 8 by the collection pipe 8a. The control valve 17 is arranged at the distribution point 7. Here, the cooling arrangement 15, except for the heat exchangers 3a and 3b flowed through according to the U-flow pattern, corresponds to the cooling arrangement according to FIG. 6.

Figures 15, 16:
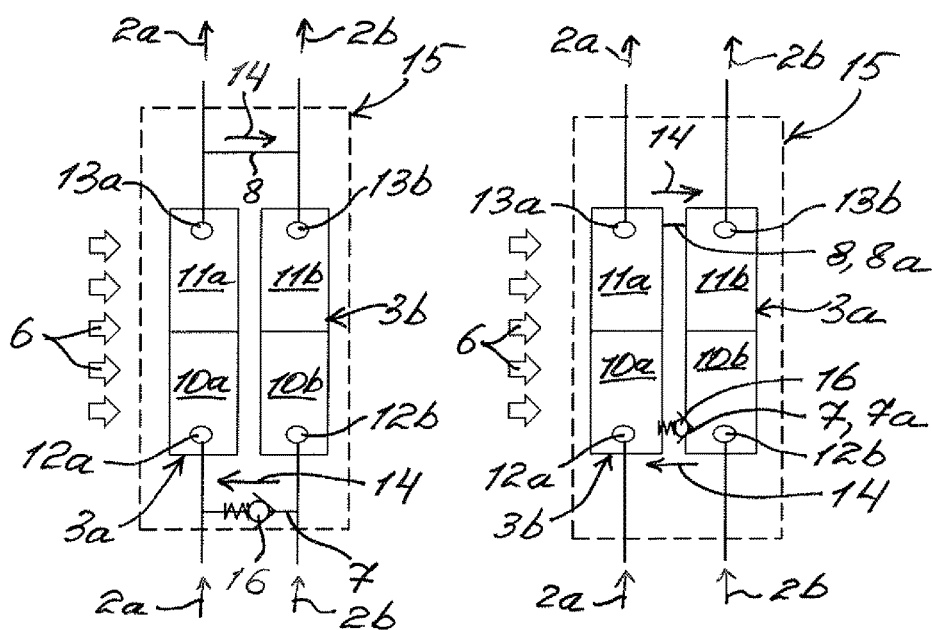

FIG. 15 shows a view of the cooling arrangement 15 that is provided for the cooling system 1. Here, the distribution point 7 and the collection point 8 are each depicted by a pipe. The non-valve 16 is arranged at the distribution point 7. Here, the cooling arrangement 15, except for the distribution point 7 configured differently and the collection point 8 configured differently and the heat exchangers 3a and 3b flowed through according to the U-flow pattern corresponds to the cooling arrangement according to FIG. 5.

FIG. 16 shows a view of the cooling arrangement 15 that is provided for the cooling system 1. Here, the distribution point 7 is depicted by the distribution pipe 7a and the collection point 8 by the collection pipe 8a. The non-return valve 16 is arranged at the distribution point 7. Here, the cooling arrangement 15, except for the heat exchangers 3a and 3b flowed through according to the U-flow pattern, corresponds to the cooling arrangement according to FIG. 5.

The invention claimed is:

1. A cooling system for a motor vehicle, comprising:
   a first circuit;
   a first heat exchanger, through which a coolant is flowable, incorporated in the first circuit;
   a second circuit;
   a second heat exchanger, through which the coolant is flowable, incorporated in the second circuit;
   the first heat exchanger and the second heat exchanger structured and arranged to be flowed through by ambient air in succession such that the coolant therein is coolable;
   the first heat exchanger arranged, relative to an airflow direction, in front of and directly adjacent to the second heat exchanger;
   wherein the first circuit and the second circuit are fluidically connected to one another at a distribution point disposed upstream of the first heat exchanger and the second heat exchanger and at a collection point disposed downstream of the first heat exchanger and the second heat exchanger such that a part mass flow of the coolant is flowable from the second circuit into the first circuit at the distribution point, from the first circuit into the first heat exchanger, and out of the first heat exchanger back into the second circuit at the collection point;

wherein a first distribution box of the first heat exchanger and a second distribution box of the second heat exchanger are fluidically connected to one another via the distribution point; and wherein a first collection box of the first heat exchanger and a second collection box of the second heat exchanger are fluidically connected to one another via the collection point.

2. The cooling system according to claim 1, further comprising a non-return valve arranged at the distribution point, the non-return valve configured to prevent the coolant of the first circuit from passing over into the second circuit at the distribution point.

3. The cooling system according to claim 1, wherein the cooling system is configured for a battery-electric motor vehicle, and wherein the cooling system further comprises:
    a cooling device fluidically incorporated in the first circuit, the cooling device configured to cool at least one of an electric drive and a traction battery of the motor vehicle; and
    an indirect condenser fluidically incorporated in the second circuit, the indirect condenser configured to at least one of cool and condense a refrigerant of an air conditioning system of the motor vehicle.

4. A cooling arrangement for a cooling system for a motor vehicle, comprising:
    a first heat exchanger incorporated in a first circuit and through which a coolant is flowable from a first inlet to a first outlet;
    a second heat exchanger incorporated in a second circuit and through which the coolant is flowable from a second inlet to a second outlet;
    the first heat exchanger and the second heat exchanger structured and arranged to be flowed through by ambient air in succession and such that the coolant therein is coolable;
    the first heat exchanger arranged, relative to an air flow direction, in front of and directly adjacent to the second heat exchanger;
    wherein the cooling arrangement is structured as an individual unit;
    wherein the first heat exchanger and the second heat exchanger are fluidically connected to one another at a distribution point disposed upstream therefrom and at a collection point disposed downstream therefrom such that a part mass flow of the coolant is flowable from the second circuit into the first circuit at the distribution point, from the first circuit into the first heat exchanger, and out of the first heat exchanger back into the second circuit at the collection point; and
    wherein the first heat exchanger and the second heat exchanger each include a distribution box, a collection box, a deflection box, and a tube block, the distribution box and the collection box arranged at a longitudinal end of the tube block and the deflection box arranged at another longitudinal end of the tube block such that the coolant is flowable through the respective heat exchanger according to a U-flow pattern.

5. The cooling arrangement according to claim 4, further comprising at least one of:
    a non-return valve arranged at the distribution point, the non-return valve configured to prevent the coolant of the first circuit from passing over into the second circuit; and
    a control valve arranged at at least one of the distribution point and the collection point, the control valve configured to adjust a rate of the part mass flow from the second circuit into the first circuit and to prevent the coolant from passing over at least one of (i) from the second circuit into the first circuit at the collection point and (ii) from the first circuit into the second circuit at the distribution point.

6. The cooling arrangement according to claim 4, wherein:
    the first heat exchanger includes a first tube block and the second heat exchanger includes a second tube block;
    the distribution point is disposed (i) between the first inlet and the first tube block and (ii) between the second inlet and the second tube block; and
    the collection point is disposed (i) between the first tube block and the first outlet and (ii) between the second tube block and the second outlet.

7. The cooling arrangement according to claim 6, wherein:
    the distribution point is defined by a distribution pipe and the collection point is defined by a collection pipe;
    the distribution pipe fluidically connects a first distribution box of the first heat exchanger and a second distribution box of the second heat exchanger; and
    the collection pipe fluidically connects a first collection box of the first heat exchanger and a second collection box of the second heat exchanger.

8. The cooling arrangement according to claim 6, wherein:
    a first distribution box of the first heat exchanger and a second distribution box of the second heat exchanger are each defined by a respective one of two distribution regions of a common distribution box, the two distribution regions fluidically separated from one another and exclusively fluidically interconnected via a distribution opening defining the distribution point; and
    a first collection box of the first heat exchanger and a second collection box of the second heat exchanger are each defined by a respective one of two collection regions of a common collection box, the two collection regions fluidically separated from one another and exclusively fluidically interconnected via a collection opening defining the collection point.

9. A method for operating a cooling system including a first circuit, a second circuit, a first heat exchanger incorporated in the first circuit and through which a coolant is flowable, and a second heat exchanger incorporated in the second circuit and through which the coolant is flowable, the first heat exchanger arranged in front of and directly adjacent to the second heat exchanger relative to an airflow direction such that ambient air is flowable through the first heat exchanger and the second heat exchanger in succession to cool the coolant, the method comprising:
    at a distribution point disposed upstream of the first heat exchanger and the second heat exchanger, branching off a part mass flow from the coolant of the second circuit and adding the branched-off part mass flow to the coolant of the first circuit;
    conducting and cooling the branched-off part mass flow via the first heat exchanger; and
    at a collection point disposed downstream of the first heat exchanger and the second heat exchanger, branching off the branched-off part mass flow from the first circuit and conducting the branched-off part mass flow back into the second circuit;
    wherein the distribution point fluidically connects a first distribution box of the first heat exchanger and a second distribution box of the second heat exchanger; and wherein the collection point fluidically connects a first collection box of the first heat exchanger and a second collection box of the second heat exchanger.

10. The method according to claim 9, further comprising adjusting a rate of the branched-off part mass flow based on a demanded cooling capacity of the first circuit and a demanded cooling capacity of the second circuit.

11. The method according to claim 9, wherein branching-off the part mass flow at the distribution point includes adjusting a pump capacity of a first fluid pump fluidically incorporated in the first circuit and a pump capacity of a second fluid pump fluidically incorporated in the second circuit such that a pressure of the coolant in the second circuit is greater than a pressure of the coolant in the first circuit.

12. The method according to claim 9, further comprising:
adjusting a rate of the branched-off part mass flow via a pressure of the coolant in the first circuit and a pressure of the coolant in the second circuit; and
preventing a passing-over of the coolant from the first circuit into the second circuit at the distribution point via at least one of (i) the pressure of the coolant in the first circuit and the pressure of the coolant in the second circuit and (ii) a non-return valve arranged at the distribution point.

13. The method according to claim 9, further comprising:
adjusting a rate of the branched-off part mass flow via at least one of (i) a collection point control valve arranged at the collection point and (ii) a distribution point control valve arranged at the distribution point; and
at least one of (i) preventing a passing-over of the coolant from the first circuit into the second circuit at the distribution point via the distribution point control valve and (ii) preventing a passing-over of the coolant from the second circuit into the first circuit at the collection point via the collection point control valve.

14. The cooling system according to claim 1, wherein the cooling system is configured for a motor vehicle having an internal combustion engine and an air conditioning system, and wherein the cooling system further comprises:
an indirect charge air cooler fluidically incorporated in the first circuit, the indirect charge air cooler configured to cool charge air for the internal combustion engine; and
an indirect condenser fluidically incorporated in the second circuit, the indirect condenser configured to at least one of cool and condense a refrigerant of the air conditioning system.

15. The cooling system according to claim 1, wherein the distribution point is defined by a distribution pipe and the collection point is defined by a collection pipe.

16. The cooling system according to claim 1, wherein:
the first distribution box and the second distribution box are each defined by a respective one of two distribution regions of a common distribution box, the two distribution regions fluidically separated from one another and exclusively fluidically interconnected via a distribution opening defining the distribution point; and
the first collection box and the second collection box are each defined by a respective one of two collection regions of a common collection box, the two collection regions fluidically separated from one another and exclusively fluidically interconnected via a collection opening defining the collection point.

17. The cooling system according to claim 1, wherein:
the first distribution box and the first collection box are arranged at opposite longitudinal ends of a first tube block of the first heat exchanger such that the coolant is flowable through the first heat exchanger according to an I-flow pattern; and
the second distribution box and the second collection box are arranged at opposite longitudinal ends of a second tube block of the second heat exchanger such that the coolant is flowable through the second heat exchanger according to an I-flow pattern.

18. The cooling system according to claim 1, wherein:
the first heat exchanger further includes a first deflection box and a first tube block, the first distribution box and the first collection box arranged at a longitudinal end of the first tube block and the first deflection box arranged at another longitudinal end of the first tube block such that the coolant is flowable through the first heat exchanger according to a U-flow pattern; and
the second heat exchanger further includes a second deflection box and a second tube block, the second distribution box and the second collection box arranged at a longitudinal end of the second tube block and the second deflection box arranged at another longitudinal end of the second tube block such that the coolant is flowable through the second heat exchanger according to a U-flow pattern.

19. A cooling arrangement for a cooling system for a motor vehicle, comprising:
a first heat exchanger incorporated in a first circuit and through which a coolant is flowable from a first inlet to a first outlet;
a second heat exchanger incorporated in a second circuit and through which the coolant is flowable from a second inlet to a second outlet;
the first heat exchanger and the second heat exchanger structured and arranged to be flowed through by ambient air in succession and such that the coolant therein is coolable;
the first heat exchanger arranged, relative to an air flow direction, in front of and directly adjacent to the second heat exchanger;
wherein the cooling arrangement is structured as an individual unit;
wherein the first heat exchanger and the second heat exchanger are fluidically connected to one another at a distribution point disposed upstream therefrom and at a collection point disposed downstream therefrom such that a part mass flow of the coolant is flowable from the second circuit into the first circuit at the distribution point, from the first circuit into the first heat exchanger, and out of the first heat exchanger back into the second circuit at the collection point; and
wherein the first heat exchanger and the second heat exchanger each include a distribution box, a collection box, and a tube block, the distribution box and the collection box arranged at opposite longitudinal ends of the tube block such that the coolant is flowable through the respective heat exchanger according to an I-flow pattern.

* * * * *